(12) United States Patent
Karamcheti et al.

(10) Patent No.: US 10,156,890 B2
(45) Date of Patent: *Dec. 18, 2018

(54) NETWORK COMPUTER SYSTEMS WITH POWER MANAGEMENT

(71) Applicant: Virident Systems, LLC, San Jose, CA (US)

(72) Inventors: Vijay Karamcheti, Los Altos, CA (US); Kenneth Alan Okin, Saratoga, CA (US); Kumar Ganapathy, Los Altos, CA (US)

(73) Assignee: VIRIDENT SYSTEMS, LLC, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/092,492

(22) Filed: Apr. 6, 2016

(65) Prior Publication Data
US 2016/0342195 A1 Nov. 24, 2016

Related U.S. Application Data

(60) Continuation of application No. 13/952,567, filed on Jul. 26, 2013, now Pat. No. 9,513,695, which is a (Continued)

(51) Int. Cl.
*G06F 3/06* (2006.01)
*G06F 1/32* (2006.01)
*G06F 9/50* (2006.01)

(52) U.S. Cl.
CPC ............ *G06F 1/329* (2013.01); *G06F 1/3209* (2013.01); *G06F 1/3287* (2013.01); *G06F 3/061* (2013.01);
(Continued)

(58) Field of Classification Search
CPC ........ G06F 1/22; G06F 1/3203; G06F 1/3206; G06F 1/3209; G06F 1/3228;
(Continued)

(56) References Cited

U.S. PATENT DOCUMENTS 4,757,533 A 7/1988 Allen et al.
5,012,408 A 4/1991 Conroy
(Continued)

OTHER PUBLICATIONS

Nand Flash Memory, by Micron; dated 2004; 57 pages.
(Continued)

*Primary Examiner* — Hiep T Nguyen
(74) *Attorney, Agent, or Firm* — Patterson & Sheridan, LLP; Steven Versteeg

(57) ABSTRACT

In one embodiment of the invention, a memory apparatus is disclosed. The memory apparatus includes a memory array, a block read/write controller, and a random access read memory controller. The memory array is block read/write accessible and random read accessible. The block read/write controller is coupled between the memory array and an external interconnect. The block read/write controller performs block read/write operations upon the memory array to access blocks of consecutive memory locations therein. The random access read memory controller is coupled between the memory array and the external interconnect in parallel with the block read/write access controller. The random access read memory controller performs random read memory operations upon the memory array to access random memory locations therein.

16 Claims, 9 Drawing Sheets

Related U.S. Application Data division of application No. 12/490,941, filed on Jun. 24, 2009, now Pat. No. 8,521,967.

(60) Provisional application No. 61/075,331, filed on Jun. 24, 2008.

(52) U.S. Cl.
CPC .......... *G06F 3/0625* (2013.01); *G06F 3/0638* (2013.01); *G06F 3/0653* (2013.01); *G06F 3/0674* (2013.01); *G06F 3/0689* (2013.01); *G06F 9/5094* (2013.01); *Y02D 10/154* (2018.01); *Y02D 10/171* (2018.01); *Y02D 10/22* (2018.01); *Y02D 10/24* (2018.01)

(58) Field of Classification Search
CPC .... G06F 1/3231; G06F 1/3234; G06F 1/3287; G06F 1/329; G06F 3/061; G06F 3/0625; G06F 3/0638; G06F 3/0674; G06F 3/0653; G06F 3/0689; G06F 9/5094; Y02B 60/1282; Y02B 60/1246; Y02B 60/144; Y02B 60/142; Y02D 10/154; Y02D 10/171; Y02D 10/22; Y02D 10/24
See application file for complete search history.

(56) References Cited

U.S. PATENT DOCUMENTS

| | | |
|---|---|---|
| 5,379,401 A | 1/1995 | Robinson et al. |
| 5,404,478 A | 4/1995 | Arai et al. |
| 5,404,485 A | 4/1995 | Ban |
| 5,680,579 A * | 10/1997 | Young .................. G06F 3/0601 711/100 |
| 5,701,438 A | 12/1997 | Bains |
| 5,710,733 A | 1/1998 | Chengson et al. |
| 5,935,253 A | 8/1999 | Canary et al. |
| 6,052,753 A * | 4/2000 | Doerenberg ........... G01S 13/91 710/29 |
| 6,088,750 A | 7/2000 | Beaman et al. |
| 6,185,704 B1 | 2/2001 | Pawate et al. |
| 6,314,501 B1 | 11/2001 | Gulick et al. |
| 6,347,328 B1 * | 2/2002 | Harper ................. G05B 19/042 710/15 |
| 6,393,545 B1 | 5/2002 | Long et al. |
| 6,397,317 B1 | 5/2002 | Kusutaki |
| 6,408,395 B1 * | 6/2002 | Sugahara ............. G06F 1/3203 713/310 |
| 6,549,959 B1 | 4/2003 | Yates et al. |
| 6,564,326 B2 | 5/2003 | Helbig, Sr. |
| 6,765,812 B2 | 7/2004 | Anderson |
| 6,785,780 B1 | 8/2004 | Klein et al. |
| 6,970,968 B1 | 11/2005 | Holman |
| 6,990,044 B2 | 1/2006 | Kang |
| 7,034,955 B2 | 4/2006 | Bearss et al. |
| 7,091,598 B2 | 8/2006 | Fujita et al. |
| 7,123,521 B1 | 10/2006 | Louie et al. |
| 7,196,554 B2 | 3/2007 | Taskin et al. |
| 7,318,164 B2 | 1/2008 | Rawson, III |
| 7,324,352 B2 | 1/2008 | Goodwin |
| 7,734,890 B2 | 6/2010 | Morris |
| 7,774,556 B2 | 8/2010 | Karamcheti et al. |
| 7,774,631 B1 * | 8/2010 | Walton ................. G06F 1/3221 365/227 |
| 8,051,253 B2 | 11/2011 | Okin et al. |
| 8,370,672 B2 | 2/2013 | Thereska et al. |
| 8,521,967 B1 | 8/2013 | Karamcheti et al. |
| 8,732,386 B2 * | 5/2014 | O'Krafka ............ G06F 12/0284 711/103 |
| 2002/0017720 A1 | 2/2002 | Nishizawa et al. |
| 2002/0051350 A1 | 5/2002 | Take |
| 2002/0118593 A1 | 8/2002 | Takemae |
| 2002/0133684 A1 | 9/2002 | Anderson |
| 2002/0138600 A1 | 9/2002 | Singhal |
| 2002/0169990 A1 * | 11/2002 | Sherburne, Jr. ........ G06F 1/3203 713/300 |
| 2002/0181315 A1 | 12/2002 | Lee et al. |
| 2003/0061383 A1 | 3/2003 | Zilka |
| 2003/0084154 A1 * | 5/2003 | Bohrer .................. G06F 9/5061 709/226 |
| 2003/0090879 A1 | 5/2003 | Doblar et al. |
| 2003/0137862 A1 | 7/2003 | Brunnelle et al. |
| 2003/0174569 A1 | 9/2003 | Amidi |
| 2003/0188083 A1 | 10/2003 | Kumar et al. |
| 2004/0026791 A1 | 2/2004 | King et al. |
| 2004/0117581 A1 | 6/2004 | Lee |
| 2004/0160835 A1 | 8/2004 | Altman et al. |
| 2004/0186948 A1 | 9/2004 | Lofgren et al. |
| 2004/0193783 A1 | 9/2004 | Sharma et al. |
| 2004/0236877 A1 | 11/2004 | Burton |
| 2005/0044303 A1 | 2/2005 | Perego et al. |
| 2005/0166026 A1 | 7/2005 | Ware et al. |
| 2005/0204088 A1 | 9/2005 | Ho et al. |
| 2005/0235131 A1 | 10/2005 | Ware |
| 2005/0240745 A1 | 10/2005 | Iyer et al. |
| 2005/0251617 A1 | 11/2005 | Sinclair et al. |
| 2005/0028931 A1 | 12/2005 | Liou |
| 2005/0273570 A1 | 12/2005 | Desouter et al. |
| 2006/0015749 A1 | 1/2006 | Mittal |
| 2006/0050488 A1 | 3/2006 | Goodwin |
| 2006/0075192 A1 * | 4/2006 | Golden ............... G06F 12/0811 711/118 |
| 2006/0106984 A1 | 5/2006 | Bartley et al. |
| 2006/0149857 A1 | 7/2006 | Holman |
| 2006/0195631 A1 | 8/2006 | Rajamani |
| 2006/0230250 A1 | 10/2006 | Klint et al. |
| 2006/0248360 A1 * | 11/2006 | Fung ..................... G06F 1/206 713/300 |
| 2007/0016704 A1 | 1/2007 | Harari et al. |
| 2007/0245092 A1 | 10/2007 | Yeh |
| 2007/0276977 A1 | 11/2007 | Coteus et al. |
| 2008/0001303 A1 | 1/2008 | Yu et al. |
| 2008/0024899 A1 | 1/2008 | Chu et al. |
| 2008/0028186 A1 | 1/2008 | Casselman |
| 2008/0082731 A1 | 4/2008 | Karamcheti et al. |
| 2008/0082732 A1 | 4/2008 | Karamcheti et al. |
| 2008/0082733 A1 | 4/2008 | Karamcheti et al. |
| 2008/0082734 A1 | 4/2008 | Karamcheti et al. |
| 2008/0082750 A1 | 4/2008 | Okin et al. |
| 2008/0082751 A1 | 4/2008 | Okin et al. |
| 2008/0082766 A1 | 4/2008 | Okin et al. |
| 2008/0094808 A1 | 4/2008 | Kanapathippillai et al. |
| 2008/0115006 A1 | 5/2008 | Smith et al. |
| 2008/0177424 A1 * | 7/2008 | Wheeler ............... G06F 1/3203 700/295 |
| 2008/0229085 A1 | 9/2008 | Cornwell et al. |
| 2008/0244295 A1 * | 10/2008 | Mizuno ................ G06F 3/0625 713/324 |
| 2009/0080442 A1 | 3/2009 | Narayan et al. |
| 2009/0193243 A1 * | 7/2009 | Ely ....................... G06F 1/3203 713/2 |
| 2009/0210616 A1 | 8/2009 | Karamcheti et al. |
| 2009/0210636 A1 | 8/2009 | Karamcheti et al. |
| 2009/0240869 A1 | 9/2009 | O'Krafka et al. |
| 2009/0254689 A1 | 10/2009 | Karamcheti et al. |
| 2011/0077795 A1 | 3/2011 | VanGilder et al. |
| 2013/0246825 A1 | 9/2013 | Shannon |
| 2015/0234441 A1 * | 8/2015 | Jackson ............... G06F 1/3203 713/300 |

OTHER PUBLICATIONS

Microsoft Computer Dictionary, Fifth Edition; dated 2002; 8 pages.
Martinez, David E.; Office Action in U.S. Appl. No. 11/847,986; dated May 12, 2009; Publisher: USPTO, Published in: US; 23 pages.
Martinez, David E.; Office Action in U.S. Appl. No. 11/848,013; dated Jun. 1, 2009; Publisher USPTO, Published in: US; 27 pages.
Martinez, Davie E.; Office Action in U.S. Appl. No. 11/848,040; dated May 26, 2009; Publisher: USPTO, Published in: US; 25 pages.

(56) References Cited

OTHER PUBLICATIONS

Martinez, David E.; Office Action in U.S. Appl. No. 11/848,083; dated May 19, 2009; Publisher: USPTO, Published in: US; 23 pages.
Eland, Shawn; Office Action in U.S. Appl. No. 11/864,763; dated Sep. 16, 2009; Publisher: USPTO, Published in: US; 33 pages.
Eland, Shawn; Office Action in U.S. Appl. No. 11/864,763; dated Dec. 24, 2008; Publisher USPTO, Published in: US; 19 pages.
Nguyen, Hoa Cao; Office Action in U.S. Appl. No. 11/876,479; dated Oct. 29, 2008; Publisher: USPTO, Published in: US; 43 pages.
Cheung, Raymond; AQ1207:MPC824x Architecture and Applications; Smart Networks Developer Forum 2003 Asia; dated Oct. 20, 2003; Publisher: Motorola, Published in: US; 48 pages.
Candea, George et al.; Microreboot A Technique for Cheap Recovery; dated 2004; Publisher: USENIX Association, OSDI 2004; 14 pages.
Connor, Deni; Kmart shines its Blue Light on solid state disks; dated May 7, 2001; Publisher: itworld.com, Published in: US; 2 pages.
Lee, Hyung Gyu; "Energy Aware Memory Allocation in Heterogeneous Non-Volatile Memory Systems" dated Aug. 25, 2003; Publisher; Seoul National University; Published in: Korea; 4 pages.
Thomas, Deborah A.; PCT/US07/080015; Written Opinion and Search Report; dated Aug. 13, 2008; 9 pages.
Young, Lee W., PCT/US09133843 Written Opinion and Search Report; dated Oct. 22, 2009; 14 pages.
Young, Lee W.; PCT/US07/79619; Written Opinion and Search Report; dated Mar. 31, 2008; 9 pages.
Young, Lee W.; PCT/US07/079622; Written Opinion and Search Report; dated Apr. 9, 2008; 3 pages.
Young, Lee W.; PCT/US07/82162; Written Opinion and Search Report; dated Jun. 9, 2008; 3 pages.
Unknown Author; 3.5 in SATA SSD Drive; www.SuperTalent.com; dated Aug. 17, 2007; pp. 1-3; Publisher: Super Talent Technology; Published in: US.
Tseng, Hung-Wei, et al.; "An Energy Efficient Virtual Memory Systems with Flash Memory as the Secondary Storage"; ISLPED '06; dated Oct. 4, 2006; pp. 418-423; Publisher: Dept. of CS and Info Engineering; National Taiwan University, Published in: Taipei, Taiwan; 6 pages.
Williams, Martyn; Solid-State Disks Coming on Strong; Infoworld.com; dated Jun. 7, 2007; Publisher: Macworld, The Mac Experts; Published in: US; 2 pages.
Halter, Craig E.; Office Action in U.S. Appl. No. 11/864,763; dated Jun. 16, 2008; 21 pages.
Nguyen, Hoa Cao; Final Office Action in U.S. Appl. No. 11/876,479; dated Feb. 18, 2010; 27 pages.

* cited by examiner

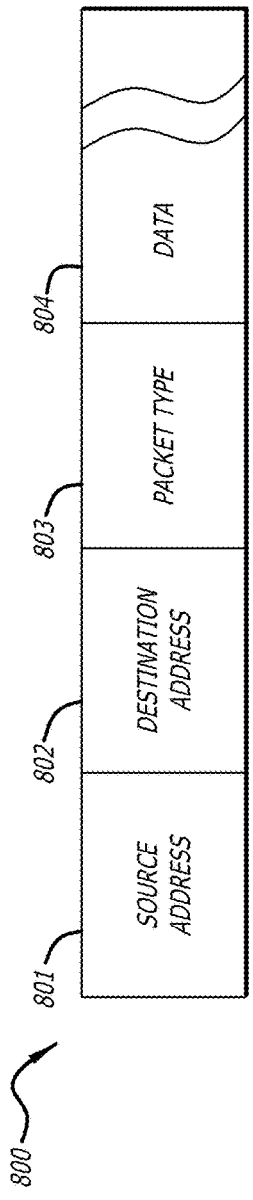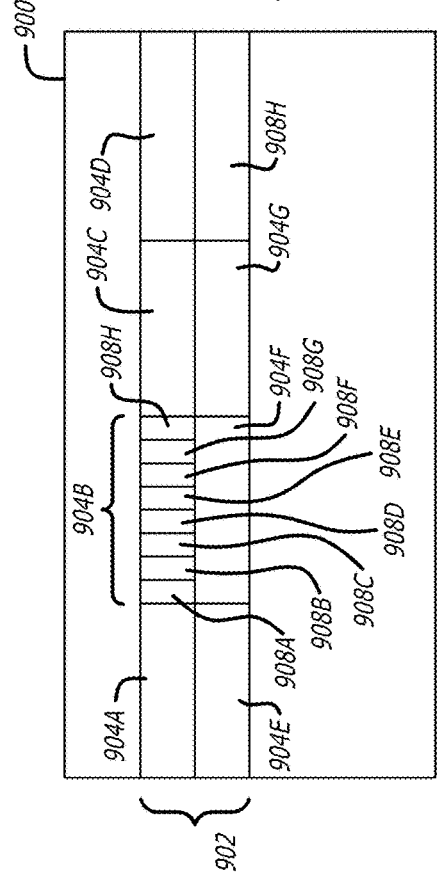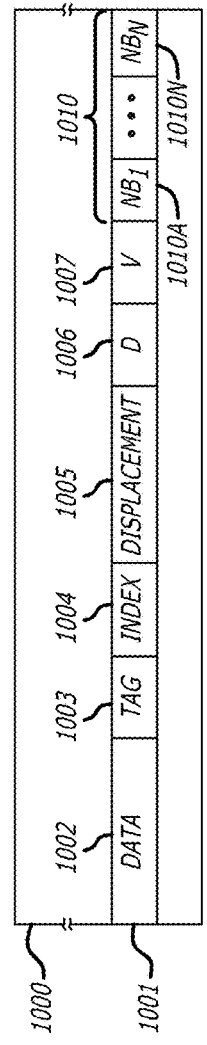

NETWORK COMPUTER SYSTEMS WITH POWER MANAGEMENT

CROSS-REFERENCE TO RELATED APPLICATIONS

This non-provisional United States (U.S.) patent application claims the benefit of and is a continuation of U.S. patent application Ser. No. 13/952,567 entitled METHODS OF MANAGING POWER IN NETWORK COMPUTER SYSTEMS filed on Jul. 26, 2013 by inventors Vijay Karamcheti et al., pending. U.S. patent application Ser. No. 13/952,657 claims the benefit of and is a divisional of U.S. patent application Ser. No. 12/490,941 entitled METHODS AND SYSTEMS FOR NETWORK COMPUTING filed on Jun. 24, 2009 by inventors Vijay Karamcheti et al., now issued as U.S. Pat. No. 8,521,967. U.S. patent application Ser. No. 12/490,941 is a non-provisional application claiming the benefit of U.S. Provisional Patent Application No. 61/075,331 entitled RANDOM READ AND READ/WRITE BLOCK ACCESSIBLE MEMORY filed on Jun. 24, 2008 by inventors Vijay Karamcheti et al.

FIELD

The embodiments of the invention relate to the organization and mapping of memory into processor address space.

BACKGROUND

It was previously understood that non-volatile memory integrated circuits were too slow to be used in main memory of server computer systems. However, because of improvements in non-volatile memory integrated circuits, particularly for the latest generation of NOR FLASH EEPROM integrated circuits, read access times have been reduced.

Additionally, a non-volatile memory integrated circuit may conserve power over that of the typical dynamic random access memory (DRAM) integrated circuit without significant read access time penalties.

Cache memory may be used to improve read and write access times of data with main memory. A computer system may include a cache coherency protocol and system to avoid stale data and maintain current data within cache memory.

BRIEF SUMMARY

The embodiments of the invention are best summarized by the claims that follow below.

BRIEF DESCRIPTIONS OF THE DRAWINGS

FIG. 8 is a block diagram of a packet routed in the interconnect network of the computing network of FIG. 5.

FIG. 9 is an exemplary block diagram of memory space within a disk-ROM.

FIG. 10 illustrates a block diagram of a cache memory and a cache line.

DETAILED DESCRIPTION

Figure 1:
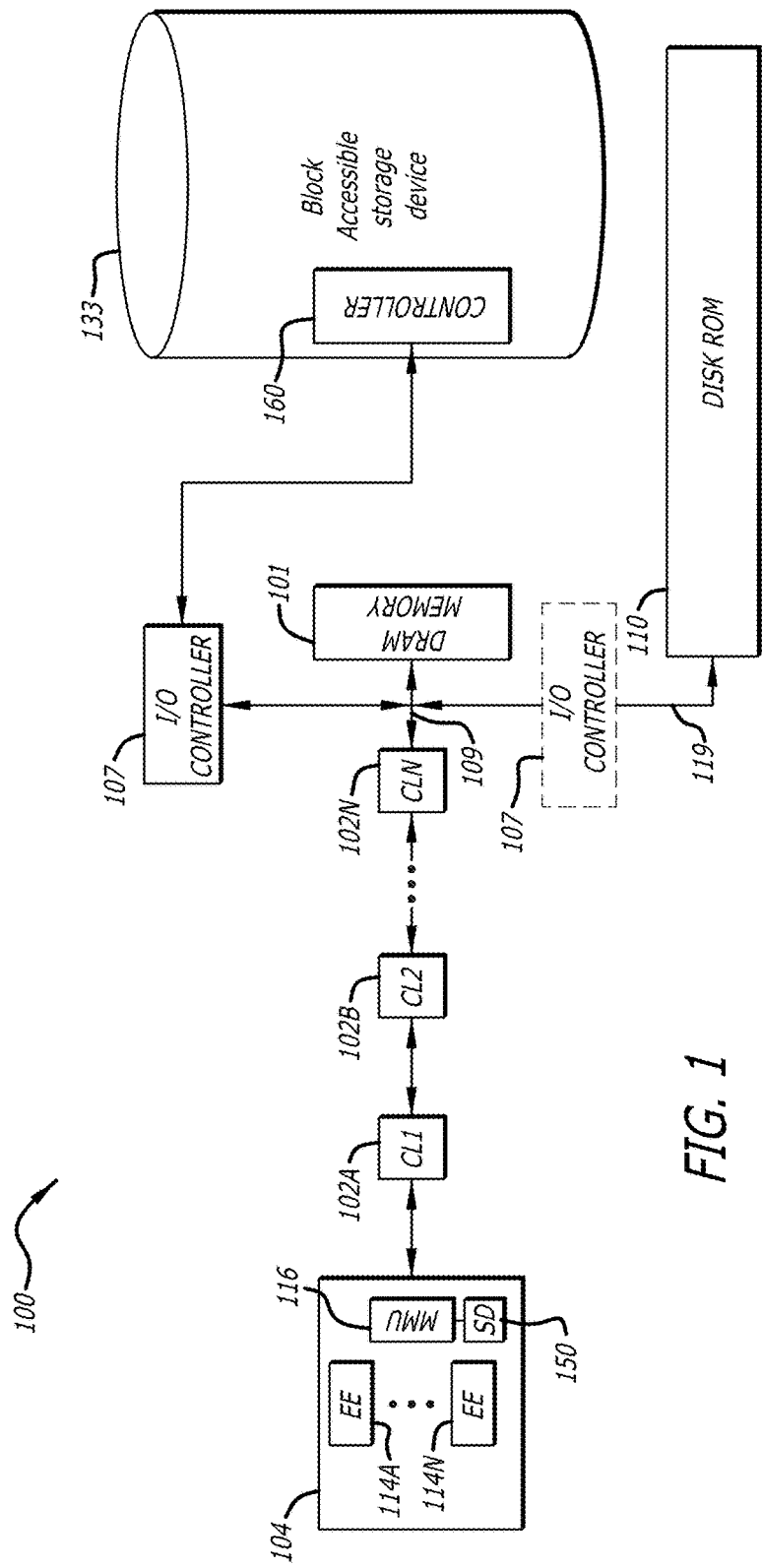
FIG. 1 is a functional block diagram of an exemplary computer system illustrating an exemplary memory hierarchy with a disk-read-only-memory (disk-ROM).

In the following detailed description of the embodiments of the invention, numerous specific details are set forth in order to provide a thorough understanding of the present invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention. The phrase interconnect is used herein to describe communication paths between elements. In some cases, the interconnect may be considered to be a bus of related signal lines.

Introduction

The hardware layer in a typical computing system usually includes a central processing unit or processor, a main memory, and a block-based or block-accessible storage device (e.g., a disk like storage device such as a hard disk drive, a solid state drive, an optical drive, etc.). One aspect to embodiments of the invention is a disk-read-only-memory (disk-ROM) that straddles the hardware layers between main memory and the block accessible storage device.

A disk-ROM as defined herein is not an optical disk, such as a compact-disc-read-only-memory (CDROM) optical disk. A disk-ROM is an electronic solid state device including a memory space formed of non-volatile memory circuit cells. A disk-ROM is coupled to a memory or input/output interconnect so that it can be read and written with data blocks as if it were a hard drive disk storage device and can also be randomly read to access random memory locations at the expected data granularity (e.g., one byte (8 bits), half-word (16 bits), word (32 bits), a double word (64 bits), or a quad word (128 bits) at a time by a machine or processor instruction as if it were random accessible main memory. A data block is a sequence of a plurality of bytes having a nominal length often referred to as a block size. The block size is larger than the expected data granularity (i.e., the number of bytes) that can accessed by a machine or processor instruction and can vary over a range such as from 128 bytes to tens of kilo-bytes for example. Data structured in this manner is often referred to as blocked data. In contrast, the expected data granularity, such as a byte, is a contiguous sequence of a fixed number of binary digits (bits) generally set by the underlying computer operating system or computer hardware. Memory locations as used herein may refer to the expected data granularity, such as a byte.

The disk ROM memory array is laid out as individual byte addressable locations corresponding to the expected data granularity of the machine instructions, such as a load instruction.

For example, consider FIG. 9 in which a byte is a contiguous sequence of eight bits with each bit denoting a single binary value of one or zero. FIG. 9 illustrates a block diagram of the memory space provided by solid state non-volatile memory circuit cells within a disk-ROM 900. A data block 902 with a block length of eight bytes is stored in the disk-ROM 900. The data block 902 includes in this case eight bytes 904A-904H of data. Other data blocks may have a different number of bytes. Each byte of data, such as byte 904B, is made up of a fixed eights bits 908A-908H of data.

Data can be stored into a disk-ROM, as if it were a disk, and this data can then be read out as if the disk-ROM were memory. In this manner, the data is written into the disk-ROM a whole block at a time but read out from the disk-ROM one byte at a time. Referring to FIG. 9, the data block 902 is initially written into the disk-ROM as a whole. However, unlike other file system structures usually stored on hard disk-like block devices, the bytes/bits within a disk-ROM are randomly read accessible. A data byte, such as data byte 904B, amongst all the data bytes in the disk ROM can be randomly addressed and read out from the disk-ROM 900. The typical file system structure would have required that the entire block, such as block 902, be read out from memory in order to access the data byte or bit of interest resulting in an inefficient use of memory bandwidth. When only a few bytes of data within a data block are desired, it is more efficient to separately read out the byte of data.

Data can also be written as blocks into the disk-ROM and read out as blocks from the disk-ROM as if it were a disk. In this manner, the data is written into the disk-ROM a whole block at a time and read out from the disk-ROM a whole block at a time. Referring to FIG. 9, the data block 902 is initially written into the disk-ROM as a whole. If the whole block of data is desired, the data block 902 can be read out from the disk-ROM as a whole.

The data in a disk-ROM can also be made directly available to a processor or in response to a random access from anywhere within a processor complex without an additional data transfer, as if it were data stored in main memory. The memory space of the disk-ROM can be mapped into the processor memory space of a computer system so that it can be read as if it were a read-only-memory (ROM). Software functionality can be added to make this memory view of the disk-ROM appear writable by buffering written data in main memory or within the disk-ROM.

Computer System Memory Hierarchy with Disk-ROM

Referring now to FIG. 1, a computer system 100 is illustrated including a processor core 104, one or more levels of cache memory 102A-102N, a DRAM main memory 101, a block-based or block-accessible storage device 133 (e.g., a disk like storage device such as a hard disk drive), and a disk-ROM 110 coupled together as shown. The DRAM main memory 101 and the disk-ROM 110 may be coupled together by the memory interconnect 109. The block accessible storage device 133 may couple to the memory interconnect 109 through an input/output (I/O) controller 107. Optionally, an input/output (I/O) controller 107 may also be coupled between the disk-ROM 110 and the memory interconnect 109. In this manner, the disk-ROM 110 may couple to an input/output interconnect 119 and function as a memory mapped I/O device.

The processor core 104 may be a multiprocessor core including one or more execution engines 114A-114N. While the one or more levels of cache memory 102A-102N are shown external to the processor core 104 to emphasize the memory hierarchy, one or more levels of cache memory (CL1-CLN) 102A-102N may be integrated within the processor core 104. The processor core 104 may further include a memory controller or memory management unit (MMU) 116. The computer system 100 has a memory hierarchy between the processor core 104 through to the block accessible storage device 133. The memory hierarchy may include one or more levels of cache memory (CL1-CLN) 102A-102N, a DRAM main memory 101, and the block accessible storage device 133. The memory hierarchy and block accessible storage device are used to store a disk ROM software driver (SD) 150 for address mapping and data coherence of the data in the disk-ROM 110. The software driver 150 executes on the processor core 104 and may program the memory management unit 116 for address mapping and data coherence of the data in the disk-ROM 110. Accordingly, the disk-ROM software driver 150 may be referred to as a data mapping software driver.

Additionally, a computer system may have more than one processor core, each associated with its own levels of cache memory 102A-102N and main memory 101 to form a plurality of processor complexes. Typically, the memory closest or nearest to the processor (the fastest memory) has the fastest access times while the memory furthest from the processor (the slower memory) has slower access times.

The computer system 100 and its memory hierarchy further include a disk-ROM 110. The disk-ROM 110 straddles the hardware layers of main memory 101 and block accessible storage device 133 as shown. The disk-ROM 110 includes its own memory array that can be read and written with data blocks as if it were a hard drive disk storage device and it can be randomly read using a random read memory request to access random memory locations in the disk-ROM as if it were a randomly accessible main memory. The software driver 150, which is stored in a processor readable medium, can trap write requests and buffer them so that a memory array in the disk-ROM also appears to be randomly writable by a processor.

The block accessible storage device 133 includes a disk drive controller 160 to read blocks of data from a disk and write blocks of data onto the disk. Typically to read data from the block accessible storage device, blocks of data are initially transferred from the disk driver controller 160 to the main memory 101. To write data into block accessible storage device, blocks of data are first prepared in main memory 101 and then transferred to the disk driver controller 160 and the block accessible storage device 133.

Typically, application programs working in cooperation with the operating system, which in turn, may use the services of a memory management unit 116, integrated with the processor core 104 or not, bring forward data from the block accessible storage device into main memory 135 and then the levels of cache memory 102A-102N to allow the execution engines 114A-114N to actively process the data. These programs, the operating system, or the memory management unit 116 may cause blocks of data to be read from the block accessible storage device 133 into the main memory 135.

Cache lines in a cache table may be used to represent the status of data stored in the one or more levels of the cache memory 102A-102N. A valid bit in each cache line associated with the cache memory may be set to indicate that data stored in the cache memory accurately mirrors that stored in the DRAM memory 101. If the data in memory is updated so that the cache memory no longer mirrors that in memory, the valid bit can be cleared to indicate invalid data is stored in the cache memory. Alternatively, the changed data from memory can be read into cache memory to update it so that the valid bit setting is true. A dirty bit may also be included in the cache table to represent the status of data stored in the cache memory and the main memory. If the data stored in cache memory was updated and needs to be written into main memory 101, a dirty bit in the cache line may be set. After the data is written into main memory 101 the dirty bit may be cleared. In computer systems with more than one processor core, each with their own levels of cache memory, the cache lines in a cache table may also contain other bits, which provide information about the state of the memory data in all of the caches in the system.

With a memory array of the disk-ROM 110 mapped into the processor address space of the multi-processor 104, data stored in the memory array of the disk-ROM 110 may also be cached into the levels of cache memory 102A-102N to mirror the data and provide faster access thereto. The status of data in the memory array of the disk-ROM 110 may become incoherent in that the data initially stored in the cache memory may at some point no longer mirror that stored in the memory array of the disk-ROM 110. The software driver 150 may then invalidate the cache lines in the cache table by clearing the valid bit of the cache lines associated with address locations of data that changed. The software driver 150 may cause data to be read from the memory array of the disk-ROM by using a random read memory access to read a random memory location or a block read access to read a consecutive sequence of memory locations. In computer systems with more than one processor core, each with their own levels of cache memory, the software driver 150 may carry out operations to bring all of the caches in the system back into a coherent state with the contents of the memory array of disk-ROM 110.

The memory locations in the memory array of the disk-ROM 110 are block accessible so that they may be read and written like the block accessible storage device 133. In this manner, the hard disk drive storage 133 may be bypassed to perform a block write access into the memory array to write or read a sequence of data in a respective sequence of memory locations in the memory array.

The memory locations in the memory array of the disk-ROM 110 are also randomly read accessible so that they may be read like the DRAM main memory 101. In this manner, both the hard disk drive storage 133 and the DRAM main memory 101 may be bypassed to perform a random read memory access from the memory array of the disk-ROM to read out data stored in one memory location of a respective sequence of memory locations that was stored by a block write access. The random read access into memory locations of the memory array in the disk-ROM 110 avoids the typical file system sequence of operations in operating systems, which first read data from the disk storage 133 into main memory 101 before a processor can gain access to it.

With a random read memory access, data can be more quickly made available with the disk-ROM 110 than by the hard disk drive storage 133 during a random read cycle of data. During a write cycle, the hard disk drive storage 133 and the disk-ROM 110 are each written by block write operations.

Address Mapping for Disk-ROM

Upon power up, the computer system 100 with disk-ROM 110 is initialized by the software driver 150. Upon request, the software driver 150 maps some or all of the physical addressable space of the disk-ROM 110 into the processor memory (address) space 200.

Figure 2:
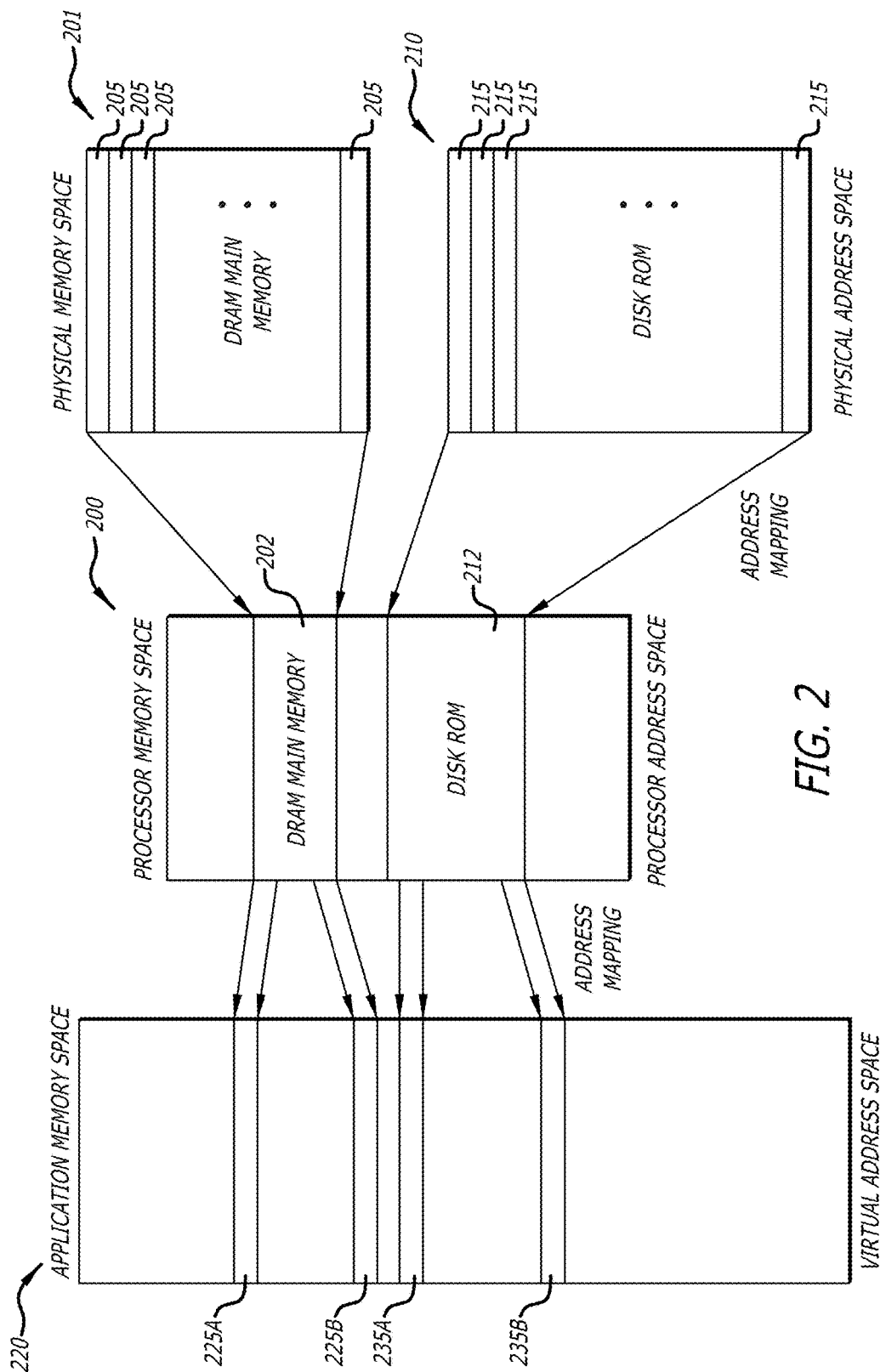
FIG. 2 illustrates an address mapping of physical address space of a system into processor address space of one or more local processors or execution units and an address mapping of processor address space into virtual address space of application memory space.

Referring now to FIG. 2, an address mapping of the physical address space of system DRAM (DRAM main memory) 201 and the disk-ROM 210 into a processor address space or a processor memory space 200 for one or more local processors of a processor complex is illustrated. FIG. 2 further illustrates an address mapping of the processor address space 200 into virtual address space or application memory space 220.

The physical address range (space) 201 of DRAM main memory includes addresses 205 into its memory locations. The physical address range (space) 210 of the disk-ROM includes addresses 215 into its memory locations.

The physical address space 201 of DRAM main memory is mapped into an address range 202 of the processor memory space 200. All or a part of the physical address space 210 of the disk ROM 210 may be mapped into an address range 212 of the processor memory space 200. That is, some or all of the address locations 215 of a memory array in the disk-ROM 110 may be mapped into the processor address space 200. Note that while the memory array of the disk-ROM is block accessible so that it can be read and written like a disk, it also has the capability of being read like a random access memory (byte-wise accessible at an expected data granularity) that allows its memory locations to mapped into the processor address space 200.

One or more portions of DRAM main memory 202 in the processor address space 200 may be mapped into one or more address ranges 225A-225B of the virtual address space or application memory space 220. One or more portions of the disk ROM 212 in the processor address space 200 may be mapped into one or more address ranges 235A-235B of the virtual address space or application memory space 220.

The mapping of the physical address space of the disk ROM through the processor address space 200 and into the virtual address space 220 for software applications running on one or more processor cores of the system is procedurally performed by the disk-ROM software driver 150 upon request. The software applications interact with the software driver 150 using a memory map file system call to map all or a part of the physical address space 210 of the disk-ROM, as comprising a portion of the processor address space 200 of the processor complex, into its own virtual address space 220. Generally, a memory map file system call is used to map files or devices into memory. A UNIX operating system (e.g., Linux, Solaris, BSD and their variants) memory map file system call or instruction is MMAP. The MMAP call or instruction has a number of attributes associated with it. The PROT-WRITE attribute of the PROT argument of MMAP system calls may be set so that pages in the memory array of the disk-ROM can be randomly written by a processor and the data updated in the disk-ROM by the software driver 150.

The MMAP file system call generates one or more pointers so that virtual addresses in the application virtual memory space directly point to the memory locations in the memory array of the disk-ROM 110. The MMAP file system call sets up the pointers in the application's virtual address space so that when the processor core executes a memory access instruction on behalf of the application, it does a virtual to physical address translation, and if that physical address points to the memory array inside the Disk-ROM then the processor performs a random read access directly from the Disk-ROM of a particular cache line that has the requested data, instead of having to invoke a disk-like controller to make the desired data available.

The MMAP file system call points to pages of memory locations into the memory array of disk-ROM device 110 so that the data is available to the processor whenever it wants it without transferring the data from the disk-ROM to another device. The MMAP file system call simply opens up a window into the disk-ROM so that a processor can readily access its data, eliminating the time it takes to make data transfers into main memory or some other device.

The window of addressable memory locations into the disk-ROM is selectable so that it can be made as large or small as desired for a given processor complex. Additionally, the software driver 150 may set up multiple portions of a memory array in a disk-ROM to be accessible to the respective multiple processors at the same time. These portions may or may not overlap. Additionally while only one disk-ROM is shown in FIG. 1, a plurality of disk-ROM devices may be coupled to the memory interconnect 109 or I/O interconnect 119 so that a plurality of windows into each respective memory array may be opened. The software driver 150, together with the MMAP file system calls requested by applications, avoids involving the processor to copy data from the disk-ROM into another device so that the data is quickly made readily available to the processor without any additional intervention.

After data is indirectly loaded into the memory array of the disk-ROM through a block access controller, the mapping of the data first into the processor address space, and then an association of these addresses to application virtual addresses by the MMAP file system call provides a more direct access to the data in the disk-ROM through random read memory operations. A random read memory request to the address locations assigned to the memory array of the disk-ROM substantially directly provides the data to the requesting processor.

Embodiments of a Disk-Read Only Memory

Figure 3A:
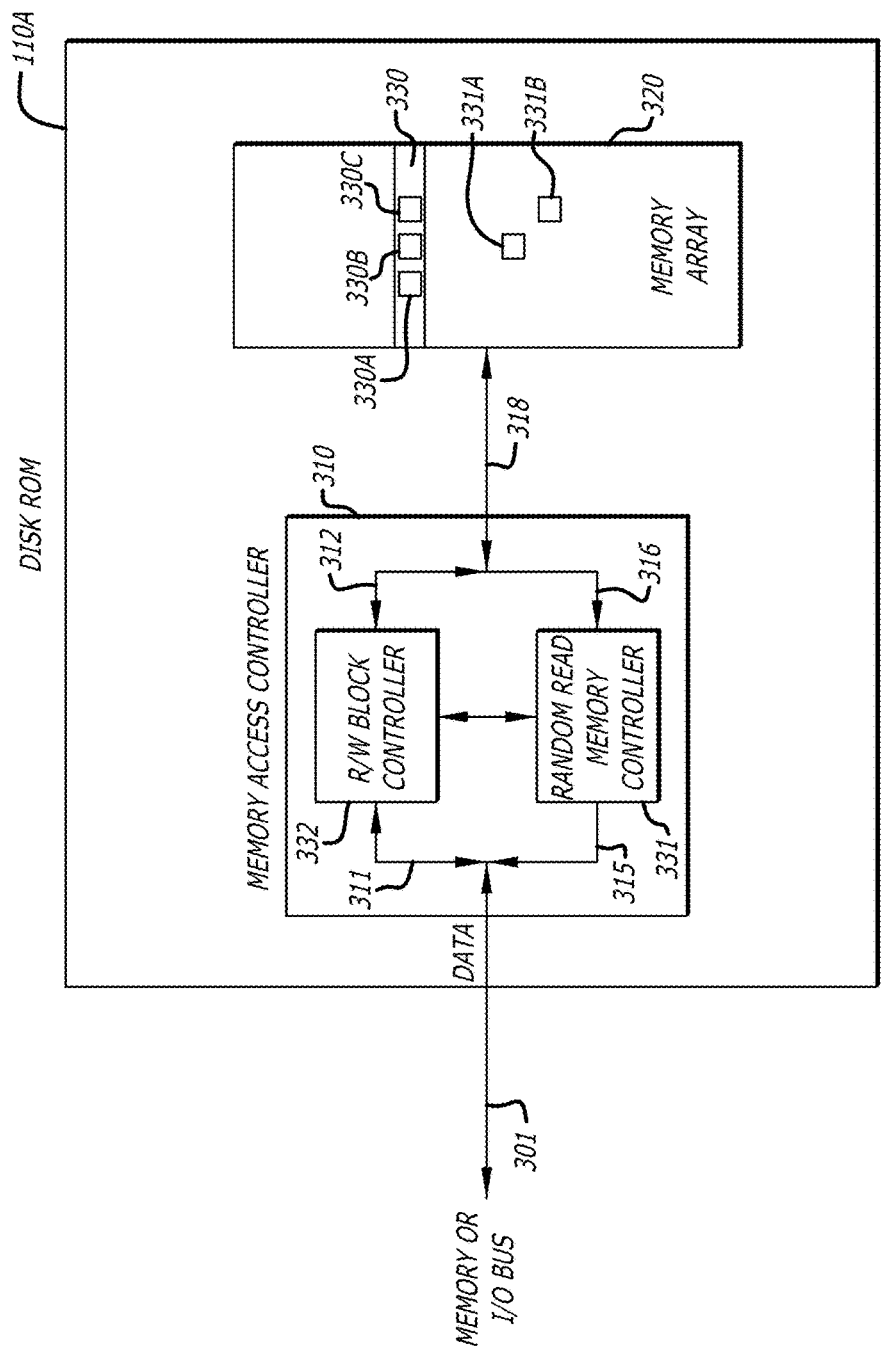
FIG. 3A is a high level functional block diagram of a disk-ROM.

Referring now to FIG. 3A, a high level functional block diagram of a disk-ROM 110A is illustrated. The disk ROM 110A includes a memory access controller 310 coupled to a memory array 320. The memory array 320 may be accessed with read and write block access in order to access a consecutive sequence of memory locations 330A-330C in a block 330. The memory array 320 may also be randomly accessed by a random read memory access request to read random memory locations, such as random memory locations 331A-331B in the memory array.

The memory access controller 310 couples to a memory or input/output (MIO) interconnect 301 to provide external access to the disk-ROM 110A. An internal memory interconnect 318 couples the memory array 320 and the memory controller 310 together.

The memory access controller 310 includes a read/write block controller 332 and a random read memory controller 331 coupled together as shown. The read and write block controller 332 and the random read memory controller 331 are coupled together to arbitrate who has access to the memory array 320 to avoid conflicts in accessing memory locations therein.

Bidirectional data interconnects 311-312 and their bidirectional drivers/receivers enable read and write block accesses to occur through the read/write block controller 332 into the memory array 320. The read/write block controller 332 couples to the memory array 320 through the interconnects 312 and 318. The read/write block controller 332 couples to a system through the interconnects 311 and 301.

Unidirectional data interconnect 315 and drivers and unidirectional interconnect 316 and its receivers enable random read memory accesses to occur into the memory array through the random read memory controller 331. The random read memory controller 331 couples to the memory array 320 through the interconnects 316 and 318. The random read memory controller 331 couples to a system through the interconnects 315 and 301.

Figure 3B:
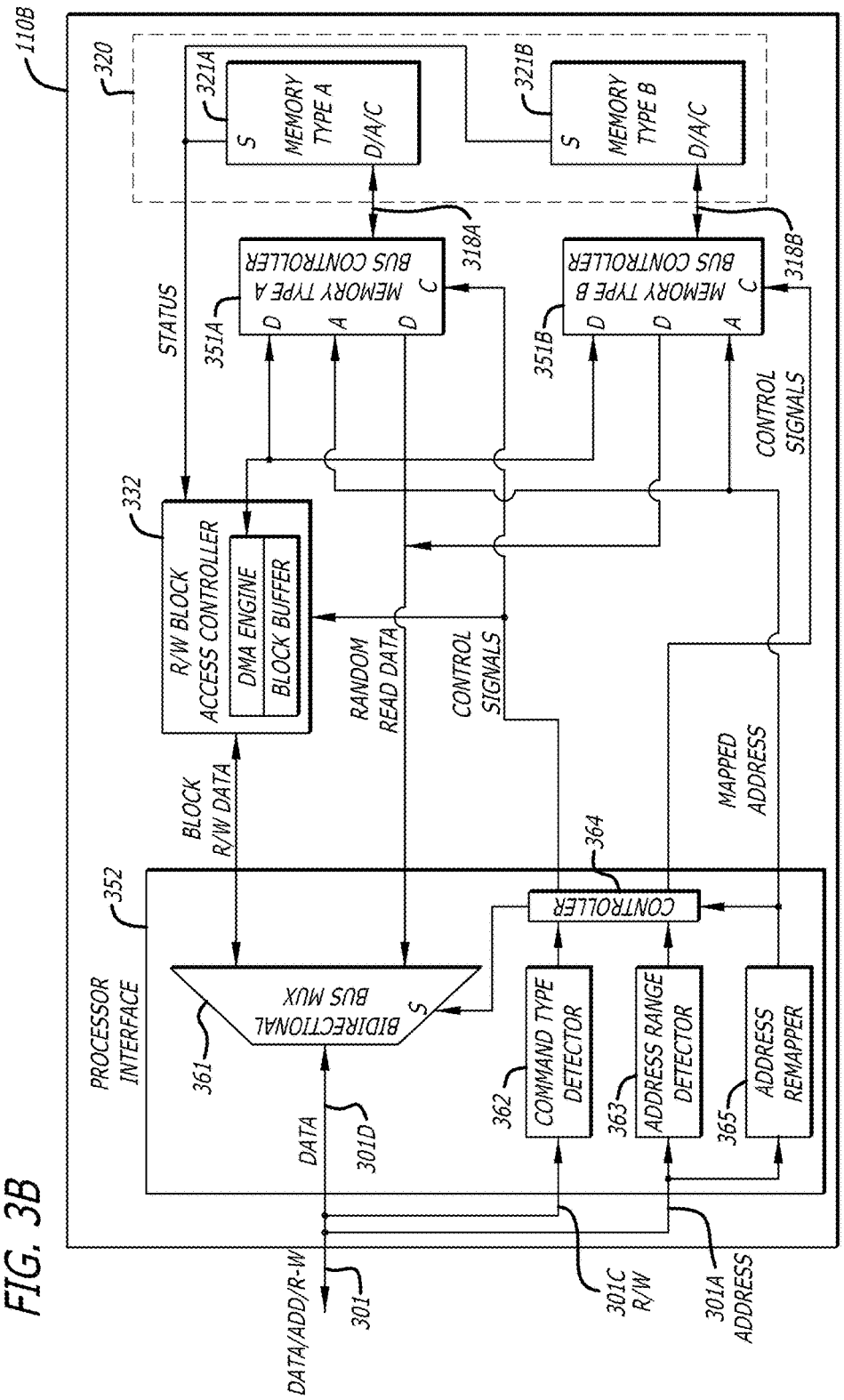
FIG. 3B is a detailed functional block diagram of an embodiment of a disk-ROM.

Referring now to FIG. 3B, a disk read only memory 110B is illustrated in detail. The disk ROM 110B couples to a system via system interconnect 301. The system interconnect conveys data 301D, control 301C, and address 301A which may reside on different signals in the interconnect or be time multiplexed on the same set of signals.

The disk ROM 110B includes a processor interface 352, a read/write block access controller 332, one or more interconnect bus controllers 351A-351B, and the memory array 320 coupled together as shown.

The memory array 320 may be made up of one or more types of memory such as a first type of memory, memory type A 321A, and a second type of memory, memory type B 321B. One memory type that may be used within the memory array 320 is a flash electrically erasable programmable read only memory (EEPROM). Another type of memory that may be used in the memory array 320 is a dynamic random access memory (DRAM). Yet another type of memory that may be used in the memory array 320 is a phase change memory. At least one of the memory types in the memory array, memory type A 321A or memory type B 321B, supports both block read/write access and random read access. The other memory type in the memory array need not support random read access but may.

In one embodiment of the invention, the memory array 320 is a homogeneous array of non-volatile or flash memory array. For example, the memory array may be uniformly formed out of NOR flash electrically erasable programmable read only memory (EEPROM) integrated circuit devices or memory modules. Alternatively, a plurality of memory type's 321A-321B in the memory array 320 may be different so that the memory array 320 is a heterogeneous memory array. In one embodiment in the invention, the memory type A 321A is a DRAM device while the second memory type 321B is a NOR flash memory device.

The one or more memory types in the memory array 320 may be coupled respectively to one or more memory type interconnect controllers, such as interconnect bus controllers 351A-351B for the respective memory types 321A-321B. An output data interconnect of the one or more interconnect bus controllers 351A and 351B are coupled together and to a first interconnect input of the bidirectional bus multiplexer 361. A first bidirectional interconnect of the one or more bus interconnect controllers 351A and 351B are coupled together and to a bidirectional interconnect port of the read/write block access controller 332.

The interconnect bus controllers 351A-351B may be programmable to properly interface to the different types of memory devices that may be used as the first type memory 321A and the second type memory 321B to form a heterogeneous memory array 320. Programmable control of a heterogeneous memory array is further described in U.S. patent application Ser. No. 11/864,763 entitled SYSTEMS AND APPARATUS WITH PROGRAMMABLE MEMORY CONTROL FOR HETEROGENEOUS MAIN MEMORY by Kenneth Alan Okin et al. filed on Sep. 28, 2007 which is incorporated herein by reference.

The processor interface 352 includes a bidirectional bus multiplexer 361, a command type detector 362, an address range detector 363, an address remapper 365, and a data path controller 364 coupled together as shown. The data interconnect 301D couples to the directional bus multiplexer 361. The control interconnect 301C, including read/write control signals, couples into the command type detector 362. The address interconnect 301A couples into the address range detector 363 and the address remapper 365.

The data path controller 364 generates control signals to control elements of the disk-ROM 110B including the one or more interconnect bus controllers 351A and 351B and the bidirectional bus multiplexer 361. In response to a random read memory request, the data path controller 364 generates random read memory access control signals to form a substantially direct unidirectional data path from the memory array through the one or more interconnect bus controllers 351A-351B and the bidirectional bus multiplexer 361 out to the data interconnect 301D of the system interconnect 301. In the case of a read or write block access to the memory array 320, the data path controller 364 generates control signals to form a data path between the memory array 320 and the data interconnect 301D through the bus multiplexer 361, the read and write block access controller 332, and the one or more memory interconnect bus controllers 351A-351B.

The command type detector 362 is coupled to the control interconnect 301C to receive control signals thereon. The command type detector 362 determines if a command type is a random read access, a block read access, or a block write access in response to the control signals. The command type detector 362 is coupled to the data path controller 364 to communicate the type of command being asserted.

The address range detector 363 is coupled to the address interconnect 310A (and any multiplexed address/data lines) to receive the address signals thereon. The address range detector decodes the address signals to determine if the address is within a range for a block access under control of the read/write block access controller 332 or if it is within an address range for a substantially direct random read memory access through the bus multiplexer 361 and a memory interconnect controller 351A-351B. The address range detector 363 is coupled to the data path controller 364 to communicate the type of address range detected (whether the address is within a range for a block access or a direct random read memory access) that is to be executed.

The address remapper 365 is also coupled to the address interconnect 310A (and any multiplexed address/data lines) to receive the address signals thereon. The address remapper 365 receives the address signals on address interconnect 301A decodes them into an initial address and maps the address presented on the processor interconnect 301A into a physical address into the memory array 320. The address remapper 365 controls the mapping of addresses in the processor memory space to physical locations in the memory array 320. The address remapper 365 is coupled to the data path controller 364 to communicate the physical address to it.

By controlling the mapping of processor interconnect addresses to physical locations, data in memory locations can be selectively stored in a first memory device (e.g., DRAM memory) 321A or a second memory device (e.g., flash memory) 321B in the memory array 320 of the disk-ROM transparently to a processor. As mentioned herein, a first memory type A 321A in the memory array is a DRAM device while the second memory type 321B is a NOR flash memory device. As a DRAM memory device has a higher transfer rate, data can be stored in a cache burst fashion with the DRAM initially and then when it is likely to be used it may be transparently remapped and moved to the NOR flash memory device in the memory array 320 over a period of time while appearing at the same external processor address.

The transfer of data between the memory types 321A-321B is transparent to the processors that may be coupled to the disk ROM 110B by the interconnect 301. The address remapper 365 facilitates the transfer of data between memory type 321A and memory type 321B. The address remapper 365 controls the transparent transfer of data between the first memory device and the second memory device, as well as any other memory device in the memory array. The transparent transfer of data between memory devices of a memory array is further described in U.S. patent application Ser. No. 11/935,224 entitled ASYMMETRIC MEMORY MIGRATION IN HYBRID MAIN MEMORY filed by Vijay Karamcheti. et al. on Nov. 5, 2007 which is incorporated herein by reference.

The read/write block access controller 332 has a first bidirectional interconnect port coupled to a second input to the bidirectional bus multiplexer 361 and a second bidirectional bus port coupled to the one or more interconnect controllers 351A-351B. The read/write block access controller 332 controls the transfer of a block of data between the memory array and the system interconnect 301 in response to a read or write block access into the disk-ROM.

The read/write block access controller 332 may include a direct-memory-access (DMA) engine in order to read and write data blocks between the system interconnect 301 and the memory array 320. The read/write block access controller may also be able to move data between different memories internal to the disk-ROM. The controller 332 may optionally include a block buffer to buffer blocks of memory therein. Alternatively, the memory array 320 may include a block buffer to buffer blocks of memory before being read out or written into the memory locations in the memory array. The read/write block access controller 332 may be coupled to status lines from the memory devices 321A-321B to determine if a block transfer of data has been completed and they are ready for additional accesses.

Data, address, and control port D/A/C respectively of each of the one or more memory types 321A and 321B are coupled to the interconnect controllers 351A-351B by the respective interconnects 318A and 318B to transfer data into and out of the memory array, to receive address signals from the remapper 365 and access physical memory locations in the array 320, and to receive control signals from the data path controller 364 (e.g., a read/write control signal). Status ports S of each of the memory types/devices include status signals that are coupled to the read/write block access controller 332.

Figure 3C:
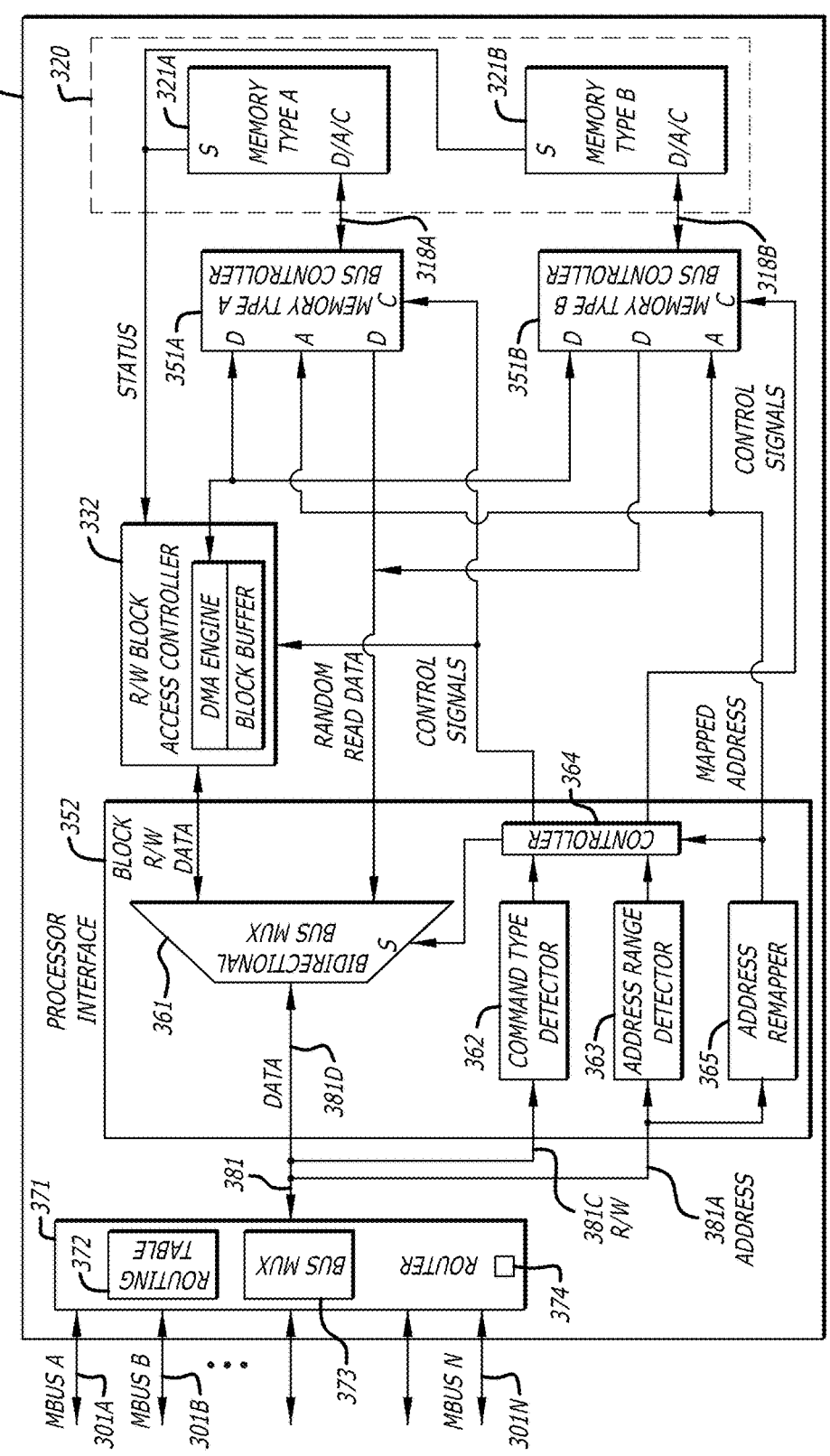
FIG. 3C is a detailed functional block diagram of another embodiment of a disk-ROM.

Referring now to FIG. 3C, a disk ROM 110C is illustrated. The disk ROM 110C includes the elements of the disk ROM 110B previously described with reference to FIG. 3b. Those elements are incorporated herein and not repeated to be brief.

Additionally the disk ROM 110C includes an internal router 371 with a routing table 372 that is coupled to a plurality of system interconnects 301A-301N. The internal router 371 facilitates routing of packets of information within a shared network cloud that is described further herein. The router 371 selects the one or more external system interconnects 301A-301N that are to be active with the internal interconnect system 381.

The internal system interconnect 381 includes a data interconnect 301D, a control interconnect 301C, and an address interconnect 301A. The data interconnect 381D of the internal interconnect 381 is coupled to the bus multiplexer 361. The control interconnect 381C of the internal interconnect is coupled into the command type detector 362. The address interconnect 381A of the internal interconnect 381 is coupled into the address range detector 363 and the address remapper 365. As before, these may be on different signals or time multiplexed on the same set of signals.

The router 371 reads the address signals representing the addresses on the external system interconnect 301A-301N to determine if the given disk ROM 110C and its internal interconnect 381 should be active to receive or transmit packets of information over one or more of the external system interconnect 301A-301N.

In response to a destination address matching that assigned to the disk ROM 110C in the routing table 372, one or more of the external systems interconnects 301A-301N are actively coupled to the internal interconnect 381. That is, one or more of the external interconnect are multiplexed to the internal interconnect 381 by a bidirectional bus multiplexer/mapper 373 in the router 371.

The router includes a packetizer/depacketizer 374 to packetize data on the internal data interconnect 381D with a source and destination address into a packet for transmission over an interconnect network. The packetizer/depacketizer 374 further parses the fields of received packets from an interconnect network to depacketize the data, address, and control on the external data interconnect so that data can be written internally onto the internal data interconnect 381D and into the memory array 320. FIG. 8 illustrates fields that may be in a packet for transfer over an interconnect network of a shared network.

Coherent Data in Processor Complex

Figure 4:
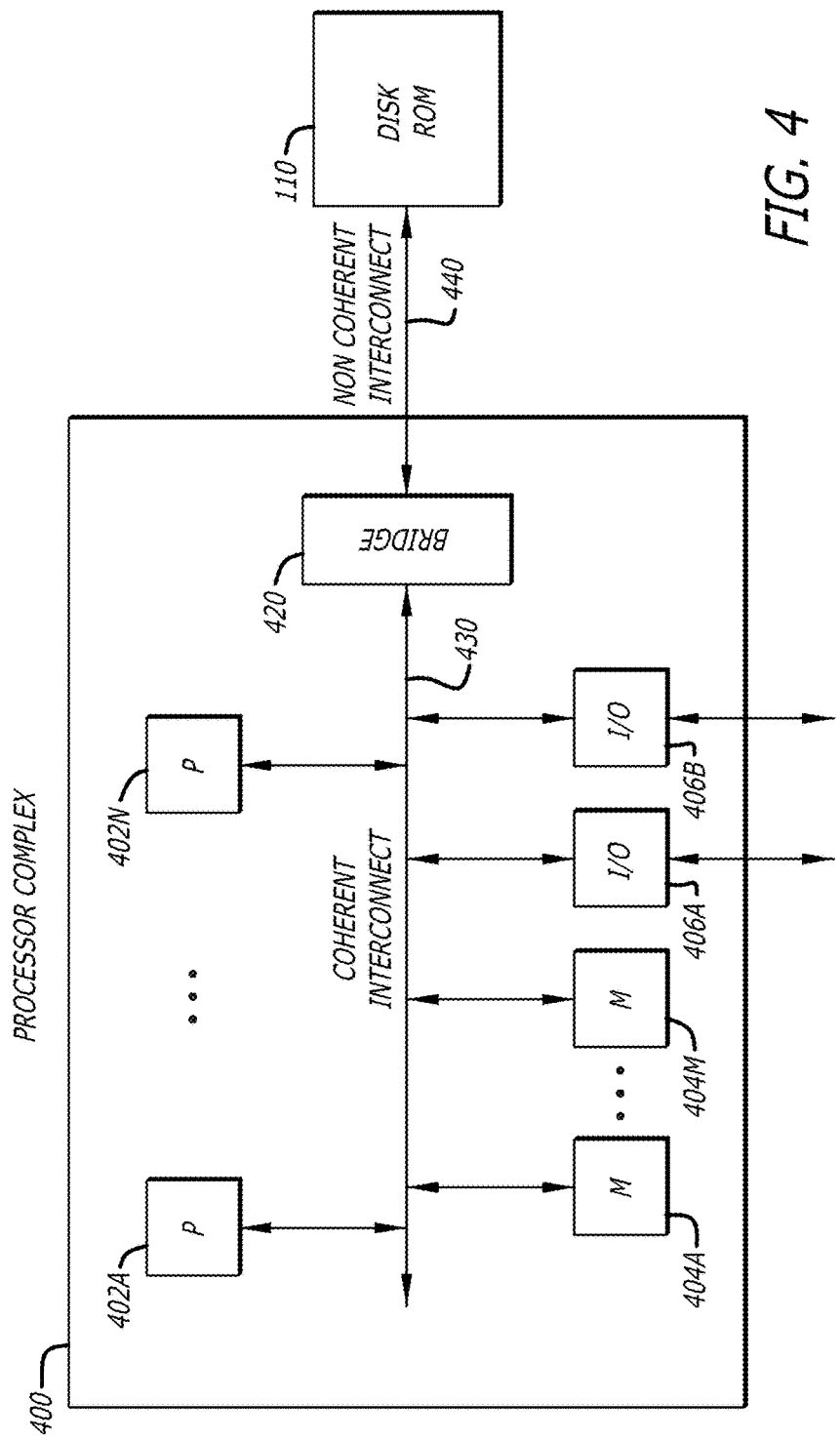
FIG. 4 is a functional block diagram illustrating a computing system with a processor complex coupled to a disk-ROM.

Referring now to FIG. 4, a processor complex 400 is coupled to a disk ROM for 110 by an external interconnect 440. The processor complex 400 includes a plurality of processors 402A-402N, a memory including a plurality of memory devices 404A-404M, one or more input/output controllers 406A-406B, and a bridge port 420 coupled together as showing in FIG. 4 by an internal interconnect 430. The plurality of processors 402A-402N share the memory devices 404A-404M, including cache memory (e.g. one or more levels of cache memory 102A-102N within the plurality of processors 402A-402N), that provide and support the main memory of the processor complex.

The processor complex 400 is cache coherent within its boundaries. That is, the devices coupled to the internal interconnect 430 are subject to a cache coherency system so that it is a coherent interconnect network. Storage devices that couple to the external interconnect 440, such as the disk-ROM 110, are considered to be outside the boundaries of the processor complex 400 and are not subject to its cache coherency system. The disk-ROM 110 does not participate in the cache coherency system of the processor complex. Instead, coherent status of the data in the disk-ROM 110 may be established by a different mechanism, such as the through an automated software process provided by the software driver 150. Thus, the external interconnect 440 may be considered to be a non-coherent interconnect network if changes are made to external data having addresses that were previously mapped into the processor memory space.

Referring now to FIGS. 3, 4, and 10, the disk-ROM 110 may have some of its data stored in a cache memory 1000 inside some processor complex. One or more block write accesses into the memory array 320 of the disk-ROM 110 may write one or more sequences of data into respective sequences of memory locations in the memory array of the disk-ROM overwriting data that was mirrored in the cache memory 1000. Changes to data stored in the disk-ROM are not directly propagated to all of the processors in a computer system. Instead, the software driver 150 may generate a plurality of memory change notifications if the data has changed as a result of the one or more block write accesses.

Figure 5:
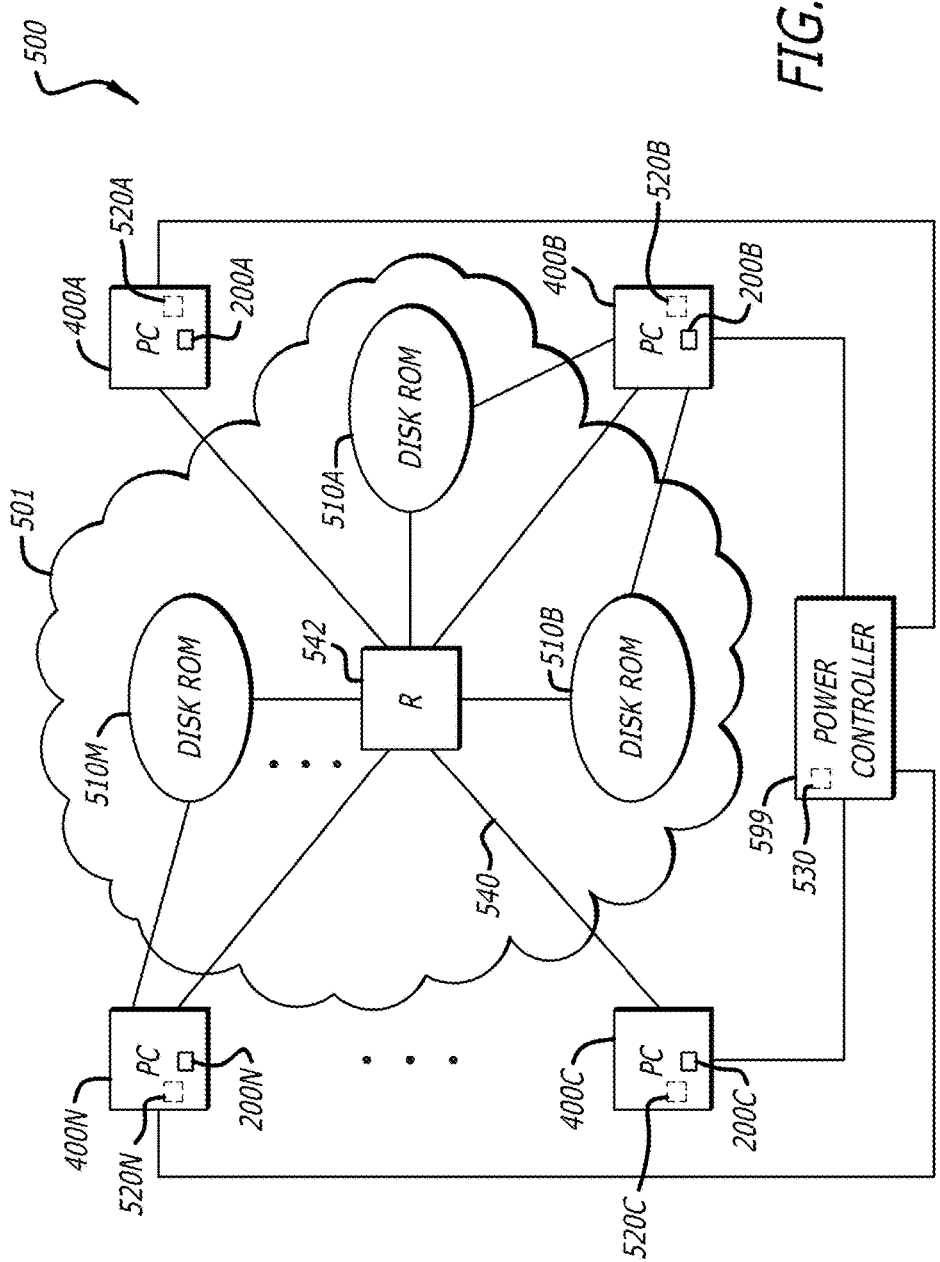
FIG. 5 is a functional block diagram illustrating a computing network with a plurality of processor complexes coupled to a shared network cloud of one or more disk-ROMs.

In FIG. 10, each of the one or more cache lines 1001 in the cache memory may include a data field 1002 of one or more bytes of data, a tag field 1003, an index field 1004, a displacement field 1005, a dirty bit D 1006, a valid bit 1007, and a network field 1010 formed of one or more network bits $NB_1$-$NB_N$ 1010A-1010N. The tag field 1003, the index field 1004, and the displacement field 1005 are used to indicate the address into the memory array 320 of the disk-ROM 110 or the DRAM main memory. The network bits in the network field 1010 may be used to support cache coherency over a network computer system such as shown in FIG. 5.

Upon receiving a first change notification, a cache line 1001 may be invalidated (updated) to indicate the data 1002 has changed and that the cache line needs updating. The valid bit 1007 is set or cleared to indicate invalid data is in the cache line 1001. When the data field 1001 in the cache line 1001 is updated, the dirty bit 1006 may be set or cleared to indicate that data in the memory array in the disk-ROM or DRAM main memory needs to be updated with the contents of the data field from the cache line to avoid an immediate write back. A cache line may also be updated by fetching the changed data associated with the same memory location. However, it may be an inefficient use of resources to constantly invalidate or update a cache line for each single change notification. It may be more efficient to batch a plurality of change notifications together and periodically invalidate or update a plurality of cache lines 1001 associated with the plurality of change notifications.

In one aspect of the invention, the software driver, working in cooperation with the disk-ROM controller, accumulates a plurality of memory change notifications in memory devices 404A-404M of a main memory in the processor complex. In a batch operation, the software driver invalidates or updates a plurality of cache lines 1001 in the cache memory 1000 of the processor complex in response to the accumulated plurality of memory change notifications. This provides cache coherency for the data stored in the memory array of the disk-ROM. The software driver may wait to invalidate or update the cache lines until one or more block write accesses have changed data and before the next random read memory tries to access the respective sequences of memory locations in the memory array that were changed when written by the one or more block write accesses.

In FIG. 4, a single processor complex 400 is illustrated. However, a computing system may include a plurality of processor complexes 400 coupled to a plurality of disk ROM's 110 by an interconnection network. The software driver 150 executing on one or more execution units in one or more of the processors in each of the plurality of processor complexes may cooperate with each other to provide cache coherency within the respective processor complexes with respect to accesses against the plurality of disk-ROMs that are outside the boundaries of the cache coherency system in each. Each cache line 1001 in each cache memory 1001 may include one or more network bits $NB_1$-$NB_N$ 1010A-1010N to indicate the status of a given line within a network computer system.

Shared Network Cloud with Disk-ROMS

Referring now to FIG. 5, a network computer system 500 is illustrated including a plurality of processor complexes 400A-400N coupled to a shared memory network 501. The shared memory network 501 includes a plurality of disk ROMs 510A-510M coupled together by an interconnection network 540 with possibly one or more external routers R 542 (or switches). The interconnection network 540 may be a mesh network supported by internal and external routers to selectively interconnect each of the processor complexes to each of the disk-ROMs 510A-510M of the shared memory network 501. In one embodiment of the invention, the interconnect network 540 is a hypertransport (HT) routable point to point mesh network.

The plurality of disk ROM's 510A-510M instantiated in the shared memory network 501 may be one or more of the disk ROM's 110A-110C respectively illustrated by the functional block diagrams of FIGS. 3A-3C.

In FIG. 5, the four or more processor complexes 400A-400N may read and write blocks of data into and out of any disk-ROM in the shared memory cloud as if it were a disk file system. Furthermore, one or more processor complexes 400A-400N may randomly read memory locations of any disk-ROM in the shared memory cloud as if it were a read only memory. That is, the disk ROM devices 510A-510M may be read and written to as if they were disk-like devices and may be read from as if they were read only memory devices.

All or selected portions of the physical memory locations of the plurality of disk ROM devices 510A-510M may be mapped in to each of the processor memory spaces 200A-200M of each of the respective four or more processor complexes (PC) 400A-400N. All or portion of the memory array in each disk-ROM may be mapped into some or all of the processor complexes' address spaces at the same time. In this manner, some or all of the processors can access data somewhere in the memory arrays of the Disk ROMs 510A-510M independently of each other.

The mapping software drivers 150 in each processor complex 400A-400N initiate the block read/write accesses with the plurality of disk-ROM devices 510A-510M and cooperate with each other to coordinate accesses into each disk-ROM device to avoid disk-ROM resource contentions. The mapping software drivers 150 in each processor complex 400A-400N further cooperate with each other to invalidate a plurality of cache lines 1001 in respective cache memories 1000 of the one or more processor complexes 400A-400N in response to an accumulated plurality of memory change notifications. This cooperation amongst each processor complex 400A-400N provides coherency of data in the plurality of networked disk ROM devices 510A-510M. The network bits 1010A-1010N in the network field 1010 of each cache line may facilitate the cooperation amongst processor complexes and coherency of data in the plurality of networked disk ROM devices 510A-510M.

The networking computer system 500 may further include a power controller 599 coupled to the plurality of processor complexes 400A-400N in order to selectively power down one or more processor complexes when the demand for computations on the network computer system 500 have diminished and its respective processor load has decreased sufficiently enough to near zero. The power controller 599 monitors the load on the processor complexes in order to selectively power up (power on or wake) and power down (power off or sleep) one or more processor complexes without losing access to the information stored in the one or more disk-ROM devices. That is, the power controller 599 keeps the plurality of disk-ROMS 510A-501M powered on while it powers off one or more inactive processor complexes 400A-400N. This maintains the data stored in the plurality of disk-ROM devices for other processor complexes that remain powered up. Prior to powering down a processor complex 400A-400N, main memory data in a main memory of the processor complex is transferred into one or more of the plurality of disk-ROM devices 510A-510M.

Upon request, the power controller 599 can power back on one or more processor complexes to execute a process and its one or more instructions. In response, main memory data previously saved in one or more of the disk-ROM devices 510A-501M, may be transferred from the one or more of the plurality of disk-ROM devices back into the main memory of the processor complex 400A-400N.

In one embodiment of the invention, each processor complex 400A-400N has one or more processors execute a distributed network control software driver 520A-520N each of which is in communication with the power controller 530. With the network control software driver being distributed, each processor complex cooperates with the others to come up with a consistent network-level decision on those that stay up (powered on) and those that get shut down (powered down). The functionality of the network control software driver may be merged with the functionality of the disk-ROM software driver 150.

In another embodiment of the invention, instead of the distributed network control software driver 520A-520N, a centralized network control software driver 530 is optionally executed by the power controller 599 to make a consistent network-level decision on those processor complexes that stay up (powered on) and those that get shut down (powered down).

The communication of information between the processor complexes 400A-400N, the disk ROM devices 510A-510M, and the external routers 542 over the interconnect network 540 is by way of packets.

Referring now to FIG. 8, an exemplary packet 800 that is routed over the interconnect network 540 is illustrated for communication of information between the processor complexes and the disk ROM devices. The packet 800 includes a source address 801, a destination address 802, a packet-type 803, and a data field 804 including a plurality of data. The packet-type indicates the type of requested memory access desired by the packet 800. The packet-type 803 may be a read block request, a write block request, or a read random access request.

The total memory space provided by the plurality of disk ROM's 510A-510M may be partitioned in one embodiment of the invention and selectively assigned to one or more respective processor complexes. In another embodiment of the invention, the total memory space provided by the plurality of disk ROM's may be concatenated (pooled) together as one large pool of shared memory space.

Partitioning Shared Network Cloud

As discussed previously, the total memory space provided by the plurality of disk ROM's 510A-510M in a networked computer system 500 may be partitioned with the partitions being selectively assigned to one or more respective processor complexes.

Figure 6:
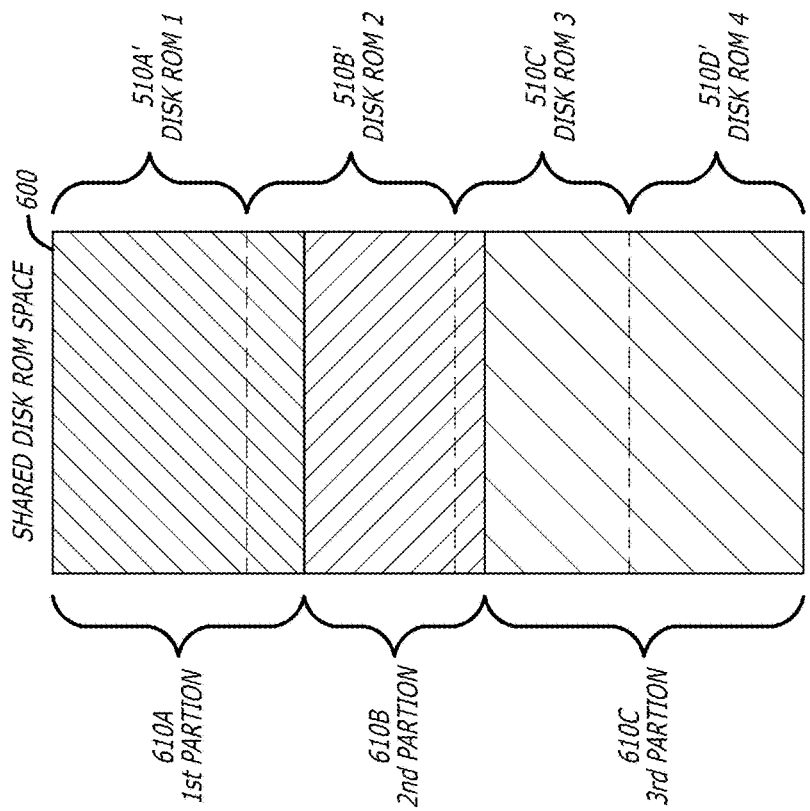
FIG. 6 is a diagram to illustrate partitioning of shared disk-ROM storage space amongst a plurality of processor complexes.

Referring now to FIG. 6, an exemplary diagram of the total disk ROM memory space 600 in a shared memory network is illustrated including disk ROM space 510A'-510D' provided by four disk-ROM devices 510A-510D. The shared disk ROM space 600 provided by the plurality of disk ROM's 510A-510D in the cloud 501 may be partitioned into a plurality of partitions. For example, the shared disk ROM space 600 may be partitioned into a first partition 610A, a second partition 610B, and a third partition 610C. A partition may extend over the memory space of a plurality of disk-ROM devices. For example, the first partition 610A extends over the disk-ROM space 510A' and a portion of the disk-ROM space 510B'.

The plurality of partitions may be assigned to one or more processor complexes (PC) 400A-400N for use. If a processor complex is powered down by the power controller 599 to conserve energy, its assigned partition may be reassigned to one or more of the other processor complexes that remain powered up.

Before the power controller 599 powers down a processor complex, its data stored in main memory 404A-404M may be transferred for storage into one or more of the disk ROM devices 510A-510M in the shared memory network cloud 501. While the processor complexes (PC) 400A-400N may be powered up when a process needs processing and powered down to conserve energy, the shared memory cloud 501 including the disk ROM devices 510A-510M may remain powered up to maintain the state of the data stored therein.

Pooling Shared Network Cloud

As mentioned previously, the total memory space provided by the plurality of disk ROM's 510A-501M in a networked computer system 500 may be concatenated or pooled together as one large pool of shared memory space. In this case, there may be no dedicated memory space assigned to a single processor complex.

Figure 7:
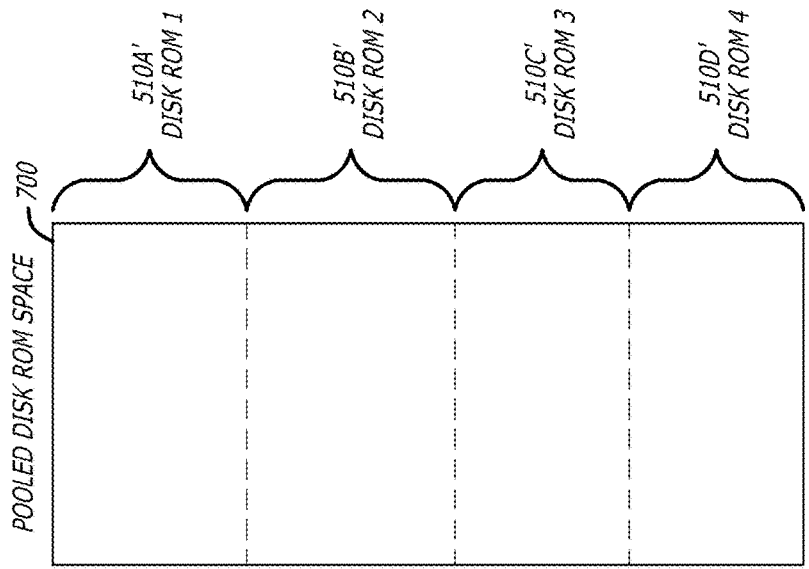
FIG. 7 is a diagram to illustrate a pooled disk-ROM storage space that may be shared by one or more processor complexes.

Referring now to FIG. 7, a pooled disk ROM space 700 is illustrated. The pooled disk ROM space 700 includes disk ROM space 510A' from disk ROM 1 510A, disk ROM space 510B' from disk ROM 2 510B, disk ROM space 510C' from disk ROM 3 510C, and disk ROM space 510D' from disk ROM 4 510D. The pooled disk ROM space 700 within the disk ROM devices may be constantly powered up and ready for access by the one or more processor complexes (PC) 400A-400N.

In this configuration, all or portions of the pooled disk ROM space 700 may be used by any one or more of the one or more processor complexes (PC) 400A-400N.

A network computer system need not use just one type of shared memory space. A first plurality of disk-ROM's in the networked computer system 500 may be concatenated or pooled together as one large pool of shared memory space while a second plurality of disk-ROM's in the networked computer system 500 may be partitioned with the partitions being selectively assigned to one or more respective processor complexes.

CONCLUSION

Some portions of the preceding detailed description have been presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It may prove convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing", "computing", "calculating", "performing", "generating", "mapping", "bypassing", "accumulating", "reading", "writing", "invalidating", "transferring", "powering up", "powering down", "maintaining", "partitioning", "repartitioning", "assigning" or the like, refer to the action and processes of a computer system, a controller, or similar electronic computing device, that manipulates and transforms data represented as physical (electronic) quantities within the computer system's registers and memories into other data similarly represented as physical quantities within the computer system memories or registers or other such information storage, transmission or display devices.

The embodiments of the invention also relate to an apparatus for performing the operations and functions described herein. This apparatus may be specially constructed for the required purposes, or it may comprise a general-purpose computer selectively activated or reconfigured by a computer program stored in a storage device of the computer. When implemented as a computer program in software, the elements of the embodiments of the invention are essentially the code segments or instructions to perform the processes and functions. The algorithm processes may be written in a computer programming language and then converted to machine code segments, loaded into a computer, and then executed to perform the processes in an automated fashion. The program or code segments can be stored in a processor, computer, or machine readable medium such as a storage device. The code segments may also be downloaded via computer networks such as the Internet, Intranet, etc and stored in the processor, computer, or a storage device (e.g., a machine readable medium).

When implemented in software, the elements of the embodiments of the invention are essentially the code segments to perform the necessary tasks. The program or code segments can be stored in a processor readable storage medium or storage device. The processor readable storage medium may include any medium that can store or transfer information. Examples of the processor readable storage medium include an electronic circuit, a semiconductor memory device, a read only memory (ROM), a flash memory, an erasable programmable read only memory (EPROM), a floppy diskette, a CD-ROM, an optical disk, a hard disk, a fiber optic medium, a radio frequency (RF) link, etc. The code segments may be downloaded via computer networks such as the Internet, Intranet, etc., by means of a computer data signal that may include any signal that can propagate over a transmission medium such as electronic network channels, optical fibers, air, electromagnetic, RF links, etc. and stored into the processor readable storage medium.

The processes presented herein may not be inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description herein. Additionally, the embodiments of the invention are not described with reference to any particular programming language. It will be appreciated that a variety of programming languages may be used to implement the teachings of the invention as described herein.

The embodiments of the invention are thus described. While certain exemplary embodiments have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

What is claimed is:

1. An apparatus comprising:
   a network computer system including:
      a plurality of processor complexes, where each processor complex has a plurality of processor cores;
      a plurality of disk-read-only-memory (disk-ROM) devices shared amongst the plurality of processor complexes, wherein a disk-ROM is an electronic solid state device including a memory space formed of non-volatile memory circuit cells;
      a router coupled to the plurality of processor cores and the plurality of disk-ROM devices;
      a plurality of external interconnects coupling the plurality of processor complexes to the plurality of disk-ROM devices, wherein the plurality of external interconnects and the plurality of disk-ROM devices are external to the plurality of processor complexes, wherein a first processor core of the plurality of processor complexes is coupled directly to a first disk-ROM device of the plurality of disk-ROM devices, wherein the first processor core is directly coupled to the router and wherein a second processor core of the plurality of processor complexes is coupled to the first disk-ROM device through the router;
      a power controller coupled to each of the plurality of processor complexes, the power controller to power down one or more processor complexes in response to a reduced computing load; and
      wherein the plurality of disk-ROM devices remain powered on and maintain data for one or more processor complexes that remain powered on.

2. The apparatus of claim 1, wherein the power controller executes a centralized network control software driver to make consistent network-level decisions of the one or more processor complexes that remain powered on and one or more processor complexes that are powered down in response to the computing load on the network computer system.

3. The apparatus of claim 1, wherein the network computer system further includes:
   a router coupled to the plurality of processor complexes and the plurality of disk-read-only-memory (disk-ROM) devices; and
   an interconnect network coupled between the router, the plurality of processor complexes, and the plurality of disk-read-only-memory (disk-ROM) devices;
   wherein the interconnect network to communicate information between the plurality of processor complexes and the plurality of disk-read-only-memory (disk-ROM) devices using one or more packets
   wherein the interconnect network includes the plurality of external interconnects.

4. The apparatus of claim 3, wherein:
   each processor complex executes a distributed network control software driver that is in communication with the power controller and the other processor complexes to cooperate and make consistent network-level decisions of the one or more processor complexes that remain powered up and the one or more processor complexes that are powered down in response to the computing load on the network computer system.

5. The apparatus of claim 3, wherein each processor complex has:
   a processor address space that includes pointers pointing to a portion of physical address space associated with at least one of the plurality of disk-read-only-memory (disk-ROM) devices.

6. The apparatus of claim 5, wherein each processor complex includes:
   a plurality of processors with each processor having an application memory space pointing to a portion of the processor address space of the processor complex.

7. The apparatus of claim 6, wherein each processor complex includes:
   a plurality of memory devices to provide a physical memory space and wherein each processor complex has processor address space that includes pointers pointing to a portion of physical memory space associated with one or more of the plurality of memory devices.

8. An apparatus comprising:
   a network computer system including:
      a plurality of processor complexes, wherein each processor complex has a plurality of processor cores;
      a plurality of disk-read-only-memory (disk-ROM) devices shared amongst the plurality of processor complexes, wherein a disk-ROM device is an electronic solid state device including a memory space formed of non-volatile memory circuit cells;
      a plurality of external interconnects coupling the plurality of processor complexes to the plurality of disk-ROM devices, wherein the plurality of external interconnects and the plurality of disk-ROM devices are external to the plurality of processor complexes;
      a power controller coupled to each of the plurality of processor complexes, the power controller to power down one or more processor complexes in response to a reduced computing load; and
      wherein the plurality of disk-ROM devices remain powered on and maintain data for one or more processor complexes that remain powered on, wherein:
      each processor complex includes a cache coherency system; and
      the plurality of external interconnects are not subject to the cache coherency system of each processor complex.

9. The apparatus of claim 8, wherein:
   each processor complex includes:
      one or more levels of cache memory;
      a cache-coherent interconnect network coupled to the one or more levels of cache memory; and
      a bridge port coupled to and between the external interconnect network and the cache-coherent interconnect network.

10. The apparatus of claim 9, wherein
    data in the plurality of disk-read-only-memory (disk-ROM) devices is maintained in a cache coherent state with each processor complex by a mapping software driver executed by each processor complex.

11. The apparatus of claim 1, wherein
the plurality of disk-ROM devices have a shared disk-ROM space that is maintained when one or more processor complexes are powered down.

12. An apparatus, comprising:
a network computer system including:
- a plurality of processor complexes, wherein each processor complex has a plurality of processor cores;
- a first means for storing data; and
- a router, wherein a first processor complex of the plurality of processor complexes is coupled directly to the first means for storing data and the router, and wherein a second processor complex of the plurality of processor complexes is coupled to the first means for storing data through the router, and wherein the first means for storing data is distinct from the first processor complex.

13. The apparatus of claim 12, further comprising a second means for storing data, wherein the second processor complex is coupled directly to the second means for storing data.

14. The apparatus of claim 13, wherein the first processor complex is coupled to the second means for storing data through the router.

15. The apparatus of claim 13, wherein the first means for storing data is capable of being written a whole data block at a time.

16. The apparatus of claim 15, wherein the first means for storing data is capable of being read one byte at a time.

* * * * *